(12) United States Patent
Matsushima

(10) Patent No.: US 11,408,775 B2
(45) Date of Patent: Aug. 9, 2022

(54) ATTACHMENT STRUCTURE FOR TEMPERATURE SENSOR

(71) Applicant: Yazaki Corporation, Tokyo (JP)

(72) Inventor: Tomohiro Matsushima, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 264 days.

(21) Appl. No.: 16/869,876

(22) Filed: May 8, 2020

(65) Prior Publication Data

US 2020/0363268 A1   Nov. 19, 2020

(30) Foreign Application Priority Data

May 15, 2019   (JP) .............................. JP2019-091857

(51) Int. Cl.

| | |
|---|---|
| *G01K 1/14* | (2021.01) |
| *H01M 10/48* | (2006.01) |
| *G01K 1/08* | (2021.01) |
| *G01K 1/143* | (2021.01) |
| *G01K 7/22* | (2006.01) |

(52) U.S. Cl.
CPC ................ *G01K 1/14* (2013.01); *G01K 1/08* (2013.01); *G01K 1/143* (2013.01); *H01M 10/486* (2013.01); *G01K 7/223* (2013.01)

(58) Field of Classification Search
USPC ................................ 374/152, 208, 163, 141
See application file for complete search history.

(56) References Cited

U.S. PATENT DOCUMENTS

| | | | | |
|---|---|---|---|---|
| 7,438,988 | B2 * | 10/2008 | Misu ................... | H01M 10/625 |
| | | | | 429/96 |
| 2016/0380319 | A1 * | 12/2016 | Rhein ................. | H01M 50/147 |
| | | | | 429/90 |
| 2018/0342775 | A1 * | 11/2018 | Sei .......................... | G01K 13/00 |
| 2018/0364108 | A1 * | 12/2018 | Tanaka ................... | G01K 1/143 |
| 2020/0014083 | A1 * | 1/2020 | Matsushima ........... | B60L 50/64 |

(Continued)

FOREIGN PATENT DOCUMENTS

| | | |
|---|---|---|
| JP | 2017-102048 A | 6/2017 |
| JP | 2018151348 A * | 9/2018 |
| WO | 2019073857 A1 | 4/2019 |

OTHER PUBLICATIONS

Translation of JP2018151348A (Year: 2018).*

*Primary Examiner* — Mirellys Jagan
(74) *Attorney, Agent, or Firm* — Sughrue Mion, PLLC

(57) ABSTRACT

An attachment structure for a temperature sensor that is attached to a flexible thin plate-shaped cable and detects the temperature of a unit cell of a battery pack having a plurality of unit cells connected with each other includes: the flexible thin plate-shaped cable; a chip-shaped temperature measuring element that is incorporated on a conductor exposed portion of the flexible thin plate-shaped cable and detects the temperature of the unit cell; and a metal leaf spring that is placed around the conductor exposed portion of the flexible thin plate-shaped cable and has a plurality of legs surrounding the temperature measuring element, and an elastic piece configured to energize the plurality of legs toward the unit cell. The temperature measuring element is sheathed with a moisture-proof material between the plurality of legs of the metal leaf spring.

7 Claims, 7 Drawing Sheets

(56) References Cited

U.S. PATENT DOCUMENTS

2020/0033196 A1* 1/2020 Tanaka ................ H01M 50/543
2020/0333192 A1 10/2020 Takase et al.
2021/0148766 A1* 5/2021 Takase ................... G01K 1/143

* cited by examiner

ATTACHMENT STRUCTURE FOR TEMPERATURE SENSOR

CROSS-REFERENCE TO RELATED APPLICATIONS

The present application is based on, and claims priority from Japanese Patent Application No. 2019-091857, filed on May 15, 2019, the entire contents of which are incorporated herein by reference.

TECHNICAL FIELD

The present application relates to an attachment structure for a temperature sensor for detecting the temperature of a unit cell of a battery pack.

BACKGROUND

JP 2017-102048 A discloses an attachment structure for a temperature sensor for detecting the temperature of a unit cell of a battery pack that is mounted on a vehicle such as an electric vehicle or a hybrid electric vehicle and used as a drive source.

An attachment structure for a temperature sensor comes into contact with one power storage element (unit cell) of a power storage module (battery pack) and detects the temperature of the power storage element with the temperature sensor. The temperature sensor includes an elastically deformable plate-shaped front spring portion and an elastically deformable plate-shaped rear spring portion. A front pressing portion and a rear pressing portion of a holder arranged on the upper surface of the power storage element come into contact with respective upper ends of the front spring portion and the rear spring portion, which extend upward from the main body to be bent in an S shape so as to intersect, from above, and the front spring portion and the rear spring portion are elastically deformed downward, so that the temperature detecting element side of the temperature sensor is pressed against the upper surface of the power storage element.

SUMMARY

However, since a spring portion in the attachment structure for a temperature sensor is made of resin, stress generated when the spring portion is deflected cannot be relaxed unless the spring length is increased in order to relax the stress. As a result, the size of the spring portion becomes large, the whole structure becomes large, and restrictions may possibly be imposed in mounting the spring portion on the power storage element (unit cell).

Moreover, since the number of components is large, assembling becomes complicated, and there is a concern that assembling processing cost is increased, and cost is increased.

The present application has been made to solve the above-described problems, and an object thereof is to provide an attachment structure for a temperature sensor that contributes to reduction of size and cost and can be attached to a unit cell in a space-saving manner.

The present application is an attachment structure for a temperature sensor that is attached to a flexible thin plate-shaped cable and detects the temperature of a unit cell of a battery pack having a plurality of the unit cells connected with each other, the attachment structure including: the flexible thin plate-shaped cable; a chip-shaped temperature measuring element that is incorporated on a conductor exposed portion of the flexible thin plate-shaped cable and detects the temperature of the unit cell; and a metal leaf spring that is placed around the conductor exposed portion of the flexible thin plate-shaped cable and has a plurality of legs surrounding the temperature measuring element, and an elastic piece configured to energize the plurality of legs toward the unit cell, in which the temperature measuring element is sheathed with a moisture-proof material between the plurality of legs of the metal leaf spring.

With the present application in which a flexible thin plate-shaped cable is used as the cable, and the temperature measuring element incorporated on a conductor exposed portion of the flexible thin plate-shaped cable is sheathed with a moisture-proof material between a plurality of legs of a metal leaf spring surrounding the temperature measuring element, it is possible to reduce the size and cost, and to realize attachment to the unit cell, the temperature of which is to be detected, in a space-saving manner.

DETAILED DESCRIPTION

Hereinafter, embodiments of the present application will be described with reference to the drawings.

Embodiments of the present application will be described with reference to FIGS. 1 to 7.

Figure 1:
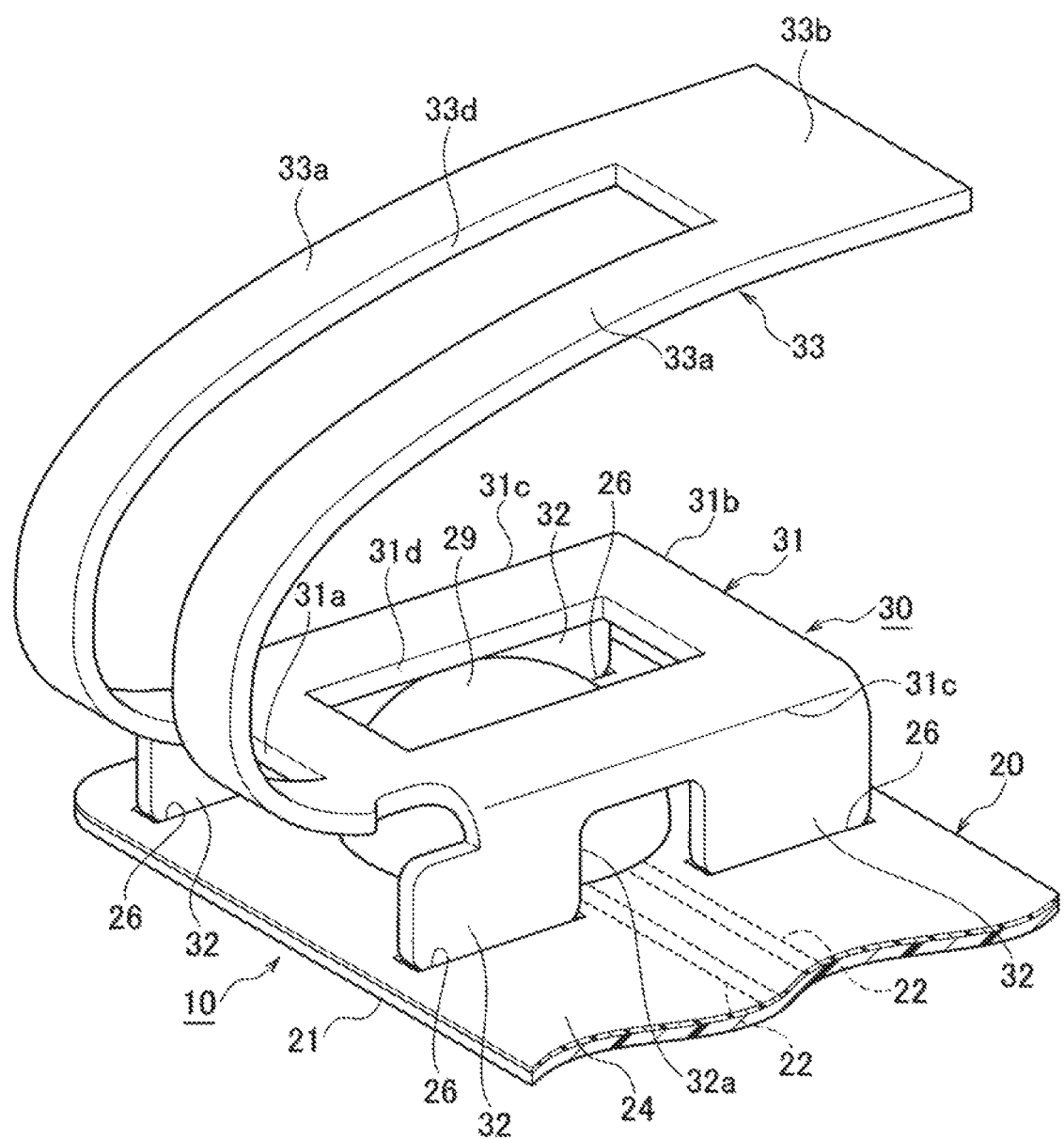
FIG. 1 is a perspective view illustrating an attachment structure for a temperature sensor according to the first embodiment of the present application.
Figure 2:
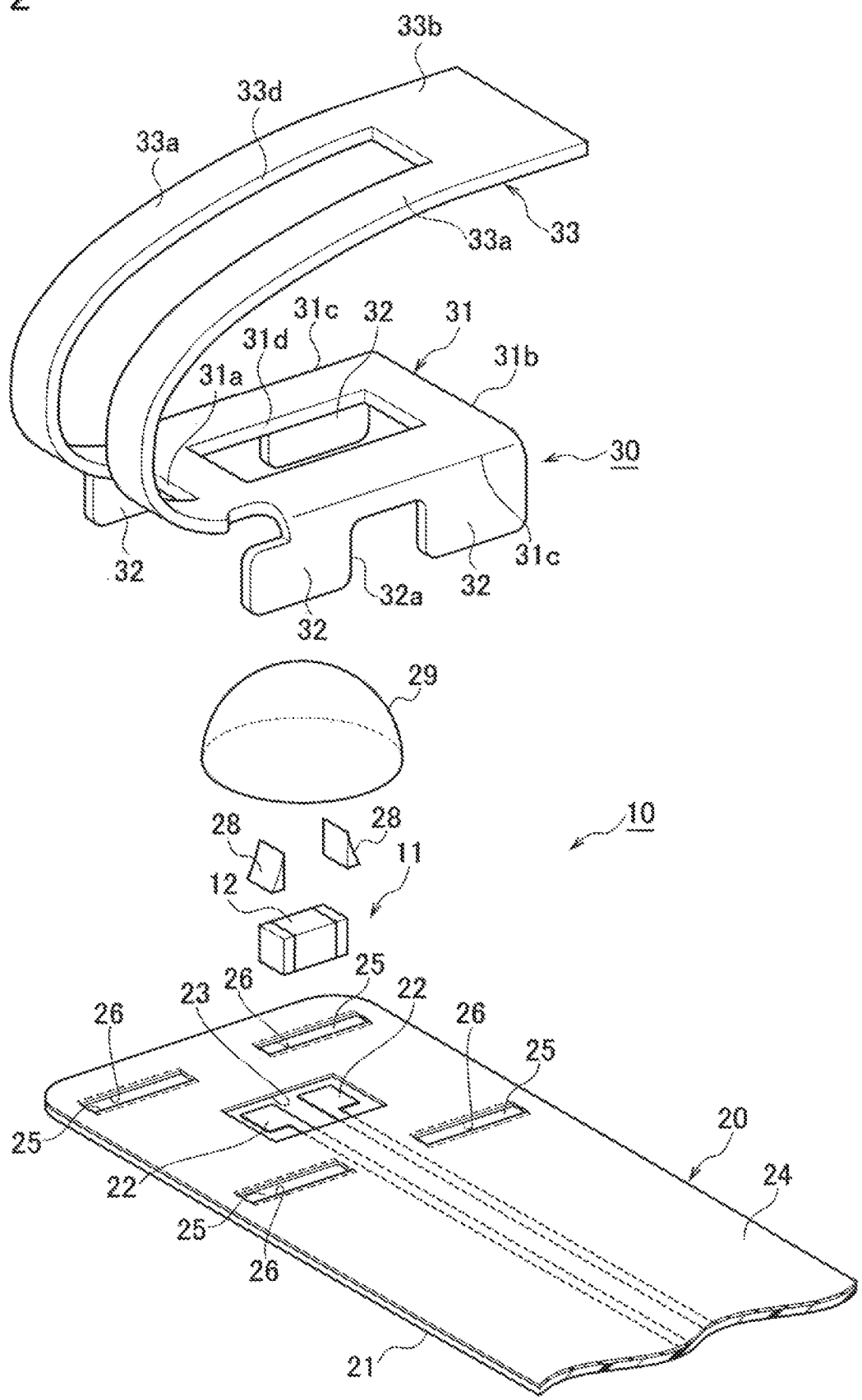
FIG. 2 is a perspective view illustrating a state before an attachment structure for a temperature sensor is assembled.
Figure 3:
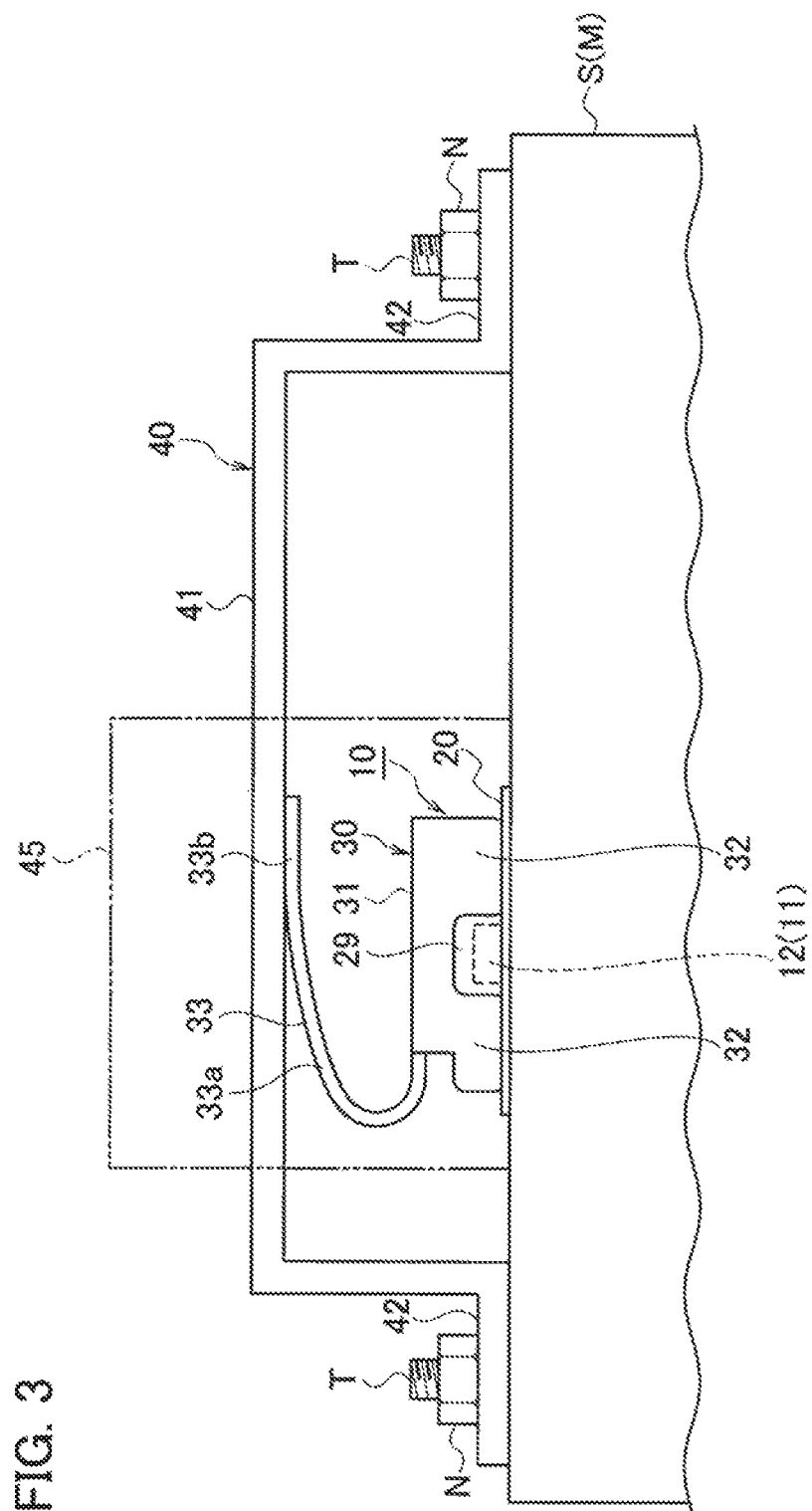
FIG. 3 is a side view illustrating a state in which an attachment structure for a temperature sensor is incorporated on a unit cell.

As illustrated in FIGS. 1 to 3, an attachment structure 10 for a temperature sensor 11 is attached to a flexible thin plate-shaped cable 20 and detects the temperature of one unit cell S of a battery pack (battery module) M having a plurality of unit cells (battery cells) S such as lithium batteries connected in series or in parallel with each other. The attachment structure 10 includes: a flexible printed wiring board 20 functioning as the flexible thin plate-shaped cable; a chip NTC thermistor (chip-shaped temperature measuring element) 12 that is incorporated by soldering on a conductor exposed portion 23 of a wiring pattern (conductor) 22 of the flexible printed wiring board 20 and detects the temperature of the unit cell S; and a metal leaf spring 30 that is placed around the conductor exposed portion 23 of the wiring pattern (conductor) 22 of the flexible printed wiring board 20 and has a plurality of legs 32 surrounding the chip NTC thermistor 12, and an elastic piece 33 that energizes the plurality of legs 32 toward the unit cell S.

As illustrated in FIG. 2, the flexible printed wiring board 20 is manufactured by bonding a thin and soft base film 21 having an insulation property such as polyimide, the wiring pattern (conductor) 22 formed on the base film 21 from a conductive metal such as a copper foil, and a film-shaped cover 24 made on the wiring pattern 22 from polyimide or the like except for a part of the conductor exposed portion 23. In FIG. 2, the extending direction of the flexible printed wiring board 20 is represented as a wiring direction, the width direction of the flexible printed wiring board 20 orthogonal to the wiring direction is represented as a wiring width direction, and the vertical direction of the flexible printed wiring board 20 in the figure that is orthogonal to the wiring direction and to the wiring width direction is represented as a thickness direction. It is to be noted that directions such as "front and rear" and "up and down" are used for convenience of description, and do not limit the actual attachment posture of each element. Two wiring patterns (conductors) 22 are formed in parallel in the wiring direction. The conductor exposed portion 23 is formed at an end portion of the wiring patterns 22, so that a part of the wiring patterns are exposed. Copper foil exposed portions 26 are formed at four locations around the conductor exposed portion 23. Each of the copper foil exposed portions 26 is provided with a rectangular plate-shaped copper foil 25.

As illustrated in FIGS. 1 and 2, the chip NTC thermistor 12 is incorporated on the conductor exposed portion 23 of the two wiring patterns 22, 22 by reflow soldering (soldering indicated by reference numeral 28 in FIG. 2) so as to straddle the two wiring patterns 22, 22. For incorporating the chip NTC thermistor 12 on the flexible printed wiring board 20, the four legs 32 of the metal leaf spring 30, which will be described later, are incorporated on the four respective copper foils 25 around a part of the flexible printed wiring board 20 where the chip NTC thermistor 12 is incorporated by soldering, so as to surround the chip NTC thermistor 12.

As illustrated in FIG. 2, the metal leaf spring 30 has a rectangular plate-shaped flat plate portion 31, each pair of legs 32, 32, and an elastic piece 33. The rectangular plate-shaped flat plate portion 31 is arranged parallel to the flexible printed wiring board 20 (plane defined by the wiring direction and the wiring width direction). Each pair of legs 32, 32 are formed to be bent at right angles from both side portions 31c, 31c in the wiring direction of the flat plate portion 31 toward the flexible printed wiring board 20. The elastic piece 33 is formed to be bent in a curved shape from a front portion 31a (one side in the wiring width direction (front side in FIG. 2)) of the flat plate portion 31 to the opposite side (one side in the thickness direction (upper side in FIG. 2)) of the flexible printed wiring board 20.

A rectangular opening 31d is formed at a center portion of the flat plate portion 31 in the wiring direction and the wiring width direction. A rectangular notch 32a is formed between each pair of legs 32, 32 of both side portions 31c, 31c of the flat plate portion 31. The lower end side (the other side in the thickness direction (lower side in FIG. 2)) of each pair of legs 32, 32 is incorporated on each copper foil 25 around a part of the flexible printed wiring board 20 where the chip NTC thermistor 12 is incorporated by soldering. More specifically, when the chip NTC thermistor 12 is soldered to the two wiring patterns 22, 22 exposed from inside of the conductor exposed portion 23 of the flexible printed wiring board 20 by reflow soldering, each pair of legs 32, 32 of the both side portions 31c, 31c in the wiring direction of the flat plate portion 31 of the metal leaf spring 30 are soldered together to each copper foil 25 of the flexible printed wiring board 20 by reflow soldering. As a result, on the flexible printed wiring board 20, a part of the periphery of the chip NTC thermistor 12 is surrounded by each pair of legs 32, 32.

As illustrated in FIG. 2, the elastic piece 33 has a pair of arms 33a, 33a that are formed to be bent in a curved shape from both sides of the front portion 31a (one side in the wiring width direction (front side in FIG. 2)) of the flat plate portion 31 to the opposite side (one side in the thickness direction (upper side in FIG. 2)) of the flexible printed wiring board 20, and a rectangular plate-shaped pressing portion 33b that couples tip sides (one side in the wiring width direction (front side in FIG. 2)) of the pair of arms 33a, 33a. An opening 33d is formed between a pair of arms 33a, 33a (the center of the elastic piece 33). The opening 33d is formed to have an opening region to overlap the opening 31d of the flat plate portion 31 in a state in which the elastic piece 33 is bent in a curved shape to the opposite side (one side in the thickness direction (upper side in FIG. 2)) of the flexible printed wiring board 20. Between each pair of legs 32, 32 of the both side portions 31c, 31c in the wiring direction of the flat plate portion 31 incorporated by soldering so as to surround the chip NTC thermistor 12 on the flexible printed wiring board 20, a moisture-proof material 29 is injected from the opening 33d of the elastic piece 33 through the opening 31d of the flat plate portion 31 so as to cover the chip NTC thermistor 12 and is potted (resin heaping).

In the attachment structure 10 for the temperature sensor 11, an attachment plate 40 is fastened and fixed via nuts N to positive and negative terminals T on both end sides of the unit cell S in a state in which a part of the flexible printed wiring board 20 on which the chip NTC thermistor 12 is incorporated is placed on the unit cell S as illustrated in FIG. 3. The attachment plate 40 presses the pressing portion 33b of the elastic piece 33 of the metal leaf spring 30 toward the unit cell S, so that reaction force due to the elastic deformation of the elastic piece 33 presses and energizes the chip NTC thermistor 12 toward the unit cell S (the other side in the thickness direction (lower side in FIG. 2)).

It is to be noted that the battery pack M is mounted on a vehicle such as an electric vehicle (EV), a hybrid electric vehicle (HEV), or a plug-in hybrid electric vehicle (PHEV) and used as a drive source. As illustrated in FIG. 3, the attachment plate 40 has a rectangular plate-shaped body portion 41 that presses the pressing portion 33b of the elastic piece 33 of the metal leaf spring 30 toward the unit cell S, and a pair of L-shaped attachment portions 42, 42 that are formed to be bent in a stepped manner from both ends of the body portion 41, and fastened and fixed to the terminals T on both end sides of the unit cell S with the nuts N. The metal leaf spring 30 is placed on the unit cell S and held at a predetermined position on the unit cell S by a resin holder 45, which the body portion 41 of the attachment plate 40 penetrates.

According to the attachment structure 10 for the temperature sensor 11 of the first embodiment, the flexible printed wiring board 20 is used as a voltage detection line (cable) connected to a battery monitoring unit (not illustrated) for monitoring the voltage or the like of the unit cell S of the battery pack M, and the chip NTC thermistor 12 is sheathed with a moisture-proof material 29 by potting between the four legs 32 of the metal leaf spring 30 surrounding the chip NTC thermistor 12 incorporated on the conductor exposed portion 23 of the wiring pattern 22 of the flexible printed wiring board 20 by soldering. With such a structure, a separate component for filling the moisture-proof material 29 becomes unnecessary, the number of components can be reduced accordingly, and the size of the entire structure and the cost can be reduced. That is, it is possible to reduce the size of a part of the flexible printed wiring board 20 where the chip NTC thermistor 12 is incorporated. Furthermore, by using the chip NTC thermistor 12 that is incorporated on the wiring pattern 22 in the conductor exposed portion 23 of the flexible printed wiring board 20 by soldering and sheathed with the moisture-proof material 29, it is possible to improve the temperature measurement performance and easily secure insulation properties.

Since the attachment plate 40 fastened and fixed to terminals T on the both end sides of the unit cell S via the nuts N presses the metal leaf spring 30 toward the unit cell S, the flexible printed wiring board 20 attached to the temperature sensor 11 is pressed against the upper surface of the unit cell S. With such a structure, the flexible printed wiring board 20 is prevented from rising from the upper surface of the unit cell S due to vibration of the vehicle or the like, and the temperature measurement performance can be further improved.

For soldering the chip NTC thermistor 12 to the wiring pattern 22 exposed from the conductor exposed portion 23 of the flexible printed wiring board 20 by reflow soldering, the legs 32 of the metal leaf spring 30 can be soldered together to the copper foils 25 exposed from the copper foil exposed portion 26 of the flexible printed wiring board 20 by reflow soldering. With such a structure, the number of assembling steps can be reduced, the processing cost can be reduced, and the assembling can be reduced in cost and simplified. Moreover, since the moisture-proof material 29 is filled from the opening 33d of the elastic piece 33 of the metal leaf spring 30 through the opening 31d of the flat plate portion 31 onto the flexible printed wiring board 20 between each pair of legs 32, 32 of both side portions 31c, 31c in the wiring direction of the flat plate portion 31, the moisture-proof material 29 can be easily injected from above the metal leaf spring 30 so as to cover the chip NTC thermistor 12. With such a structure, potting can be performed easily and in a short time. Furthermore, for soldering the legs 32 of the metal leaf spring 30 to the copper foils 25 of the flexible printed wiring board 20, a self-alignment (automatic centering) effect of solder can be also expected, and it is possible to suppress a certain amount of displacement of the metal leaf spring 30.

Since the temperature sensor 11 is pressed toward the unit cell S by the reaction force due to the elastic deformation of the elastic piece 33 of the metal leaf spring 30, the restriction on the stress is relaxed as compared with a conventional resin spring. With such a structure, a small temperature sensor 11 can be designed, and the temperature sensor 11 can be attached to the unit cell S in a space-saving manner.

Since the downsized temperature sensor 11 comes into contact with the upper surface of the unit cell S when the attachment plate 40 fastened and fixed to the terminals T on the both end sides of the unit cell S via the nuts N presses the elastic piece 33 of the metal leaf spring 30 toward the unit cell S, the contact area can be downsized. With such a structure, the heat capacity can be reduced, and the temperature measurement performance can be further improved.

For connecting the flexible printed wiring board 20 to the battery monitoring unit, connection to the battery monitoring unit can be made at the wiring pattern 22 of the flexible printed wiring board 20, and therefore a connector becomes unnecessary. With such a structure, the number of components can be reduced and the cost can be further reduced as compared with a case where connection is made with sheath cables as they are.

Figure 4:
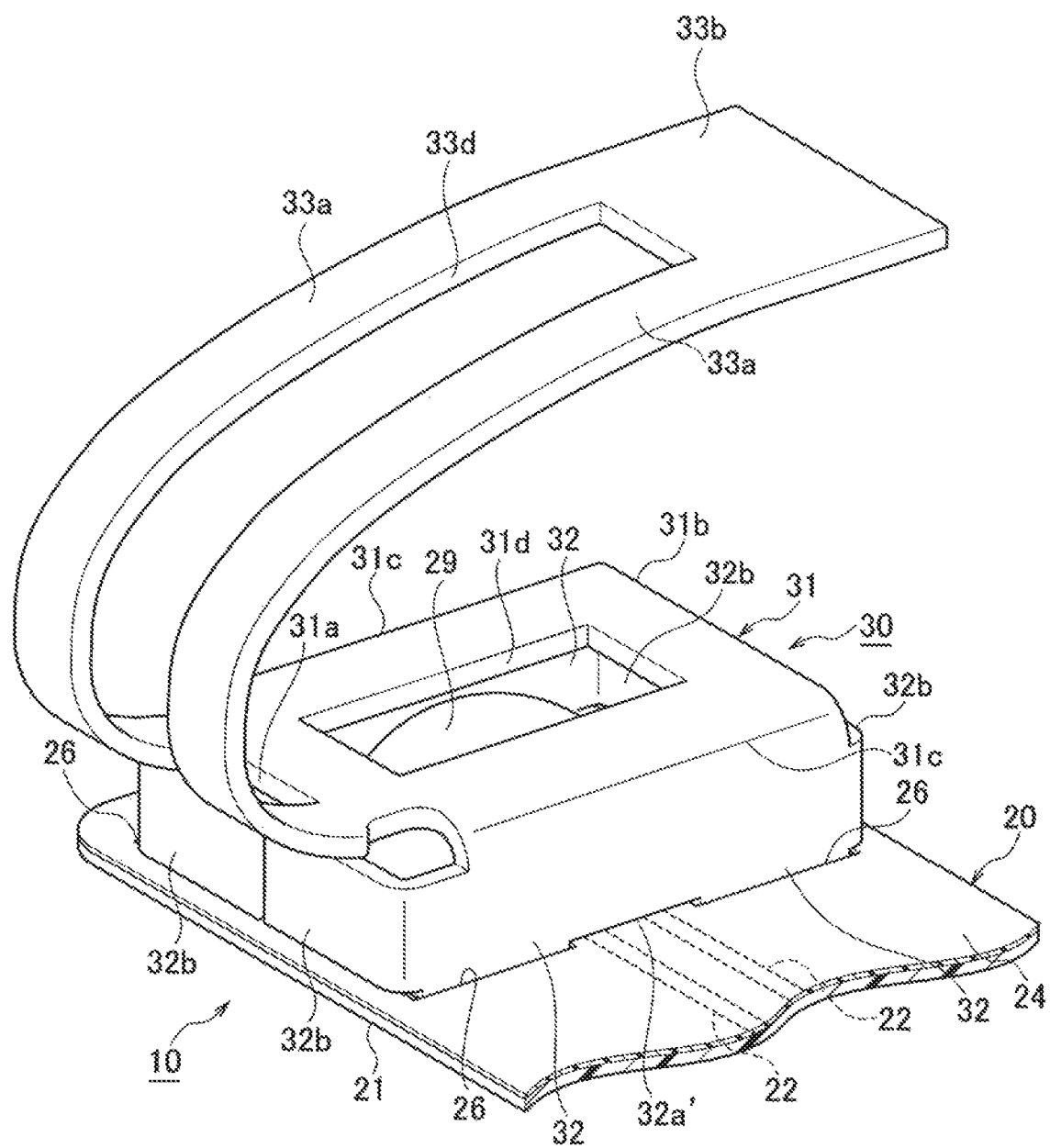
FIG. 4 is a perspective view illustrating an attachment structure for a temperature sensor according to the second embodiment of the present application.

FIG. 4 is a perspective view illustrating an attachment structure for a temperature sensor of the second embodiment of the present application.

An attachment structure 10 for a temperature sensor of the second embodiment is different from that of the first embodiment in that each pair of legs 32, 32 positioned on both sides of the metal leaf spring 30 are extended to a front portion 31a side (one side in the wiring width direction (front side in FIG. 2)) and a rear portion 31b side (the other side in the wiring width direction (back side in FIG. 2)) of the flat plate portion 31, and each extended portion 32b is bent in an L shape and formed so as to surround a periphery of the moisture-proof material 29, with which a chip NTC thermistor 12 of a temperature sensor 11 is sheathed, without any gap on a flexible printed wiring board 20. Although a notch 32a' formed between each pair of legs 32, 32 positioned on both sides is formed smaller than that of the first embodiment, it is to be noted that the other configurations are similar to those of the first embodiment, and therefore the same components are denoted by the same reference numerals, and detailed description is omitted.

The attachment structure 10 for a temperature sensor of the second embodiment offers operation and effect similar to those of the first embodiment, since the chip NTC thermistor 12 is sheathed with the moisture-proof material 29 by potting between the four legs 32 of a metal leaf spring 30 surrounding the chip NTC thermistor 12 incorporated on a conductor exposed portion 23 of wiring patterns 22 of the flexible printed wiring board 20 by soldering.

In particular, since the four legs 32 of the metal leaf spring 30 and the extended portions 32b thereof can surround the moisture-proof material 29 without any gap, spread of the moisture-proof material 29 can be reliably restricted. Moreover, since the four legs 32 of the metal leaf spring 30 and the extended portions 32b have both effects of fixing the flexible printed wiring board 20 and restricting spread of the moisture-proof material 29, it is possible to further reduce the size of a part of the flexible printed wiring board 20 where the chip NTC thermistor 12 is incorporated and further reduce the cost.

Figure 5:
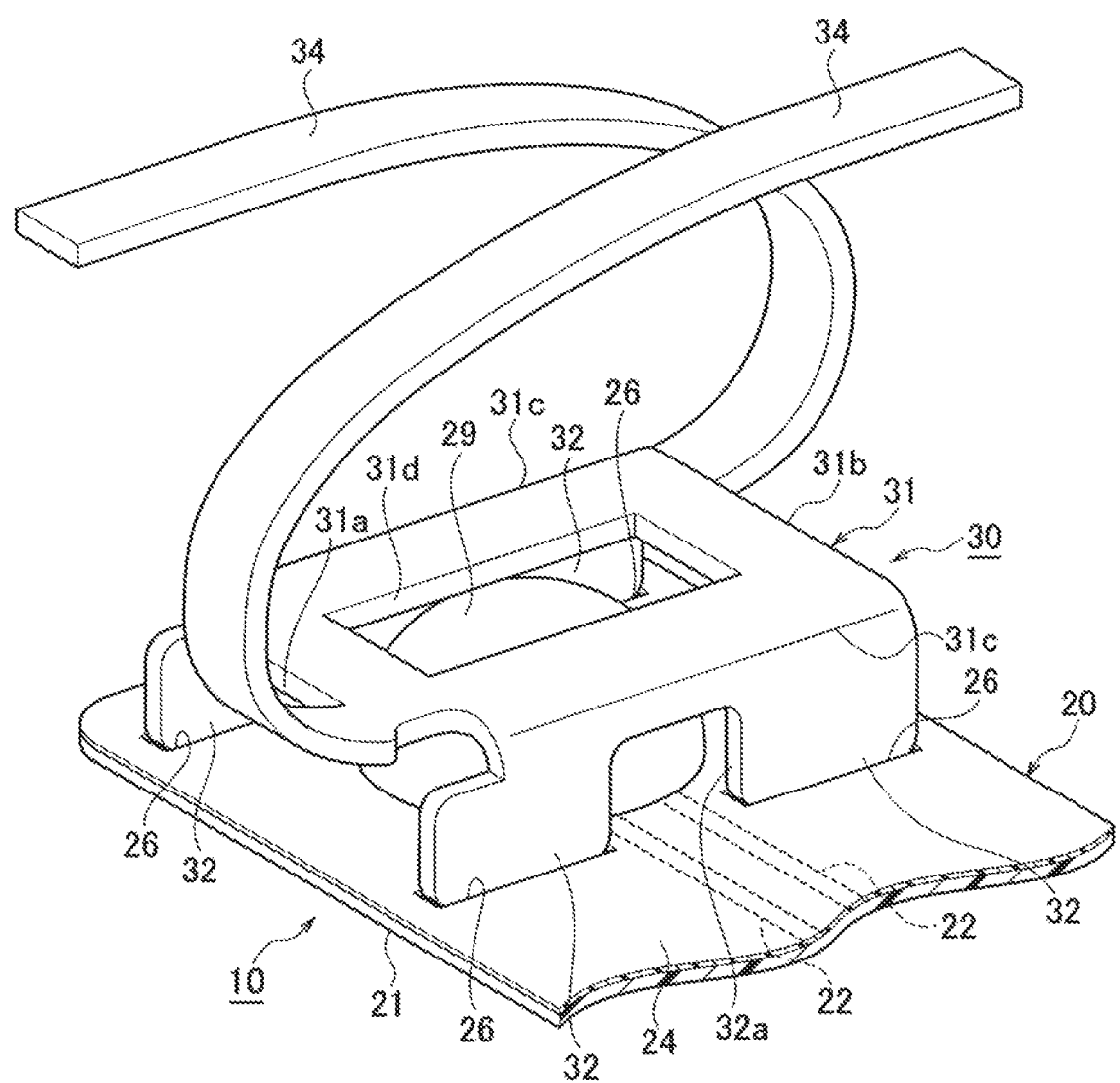
FIG. 5 is a perspective view of an attachment structure for a temperature sensor according to the third embodiment of the present application.
Figure 6:
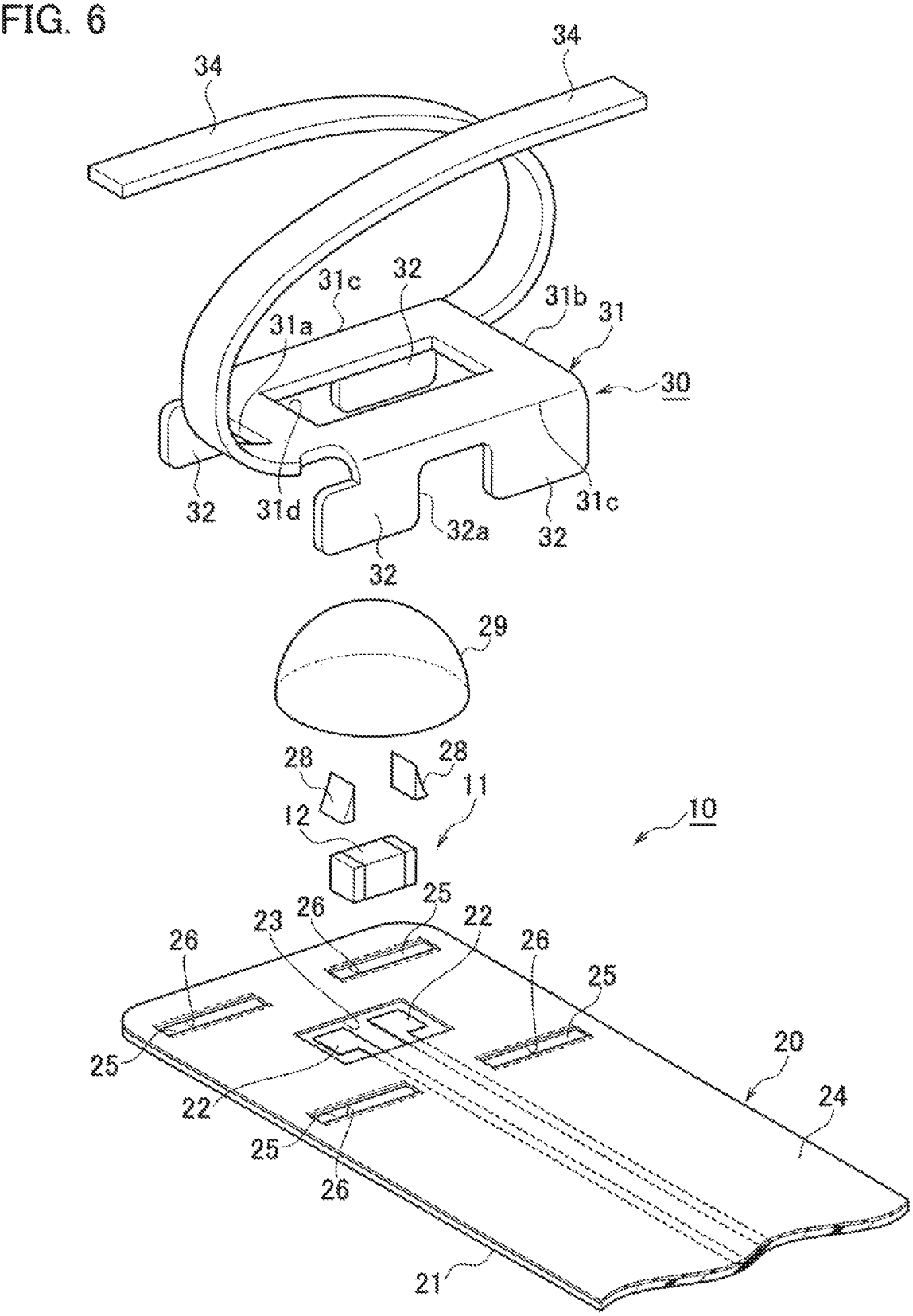
FIG. 6 is a perspective view illustrating a state before an attachment structure for a temperature sensor of the third embodiment is assembled.

FIG. 5 is a perspective view of an attachment structure for a temperature sensor of the third embodiment of the present application, and FIG. 6 is a perspective view illustrating a state before an attachment structure for a temperature sensor is assembled.

An attachment structure 10 for a temperature sensor of the third embodiment is different from that of the first embodiment in that an elastic piece 34 is formed to be bent in a curved shaped from one end side of a front portion 31a (one side in the wiring width direction (front side in FIG. 2)) and the other end side of a rear portion 31b (the other end side in the wiring width direction (back side in FIG. 2)) of a flat plate portion 31 of a metal leaf spring 30 to the opposite side (on side in the thickness direction (upper side in FIG. 2)) of the flexible printed wiring board 20 so as to intersect when viewed in the wiring direction. Since the other configurations are similar to those of the first embodiment, it is to be noted that the same components are denoted by the same reference numerals, and detailed description is omitted.

The attachment structure 10 for a temperature sensor of the third embodiment offers operation and effect similar to those of the first embodiment, since a chip NTC thermistor 12 is sheathed with a moisture-proof material 29 by potting between four legs 32 of the metal leaf spring 30 surrounding the chip NTC thermistor 12 incorporated on a conductor exposed portion 23 of wiring patterns 22 of a flexible printed wiring board 20 by soldering.

In particular, when incorporating the metal leaf spring 30 on the flexible printed wiring board 20 by soldering, the center of gravity can be easily obtained, and the assembling workability can be improved, since the elastic piece 34 is formed to be bent in a curved shaped from one end side of the front portion 31a (one side in the wiring width direction (front side in FIG. 2)) and the other end side of the rear portion 31b (the other side in the wiring width direction (back side in FIG. 2)) of the flat plate portion 31 to the opposite side of the flexible printed wiring board 20 so as to intersect.

Figure 7:
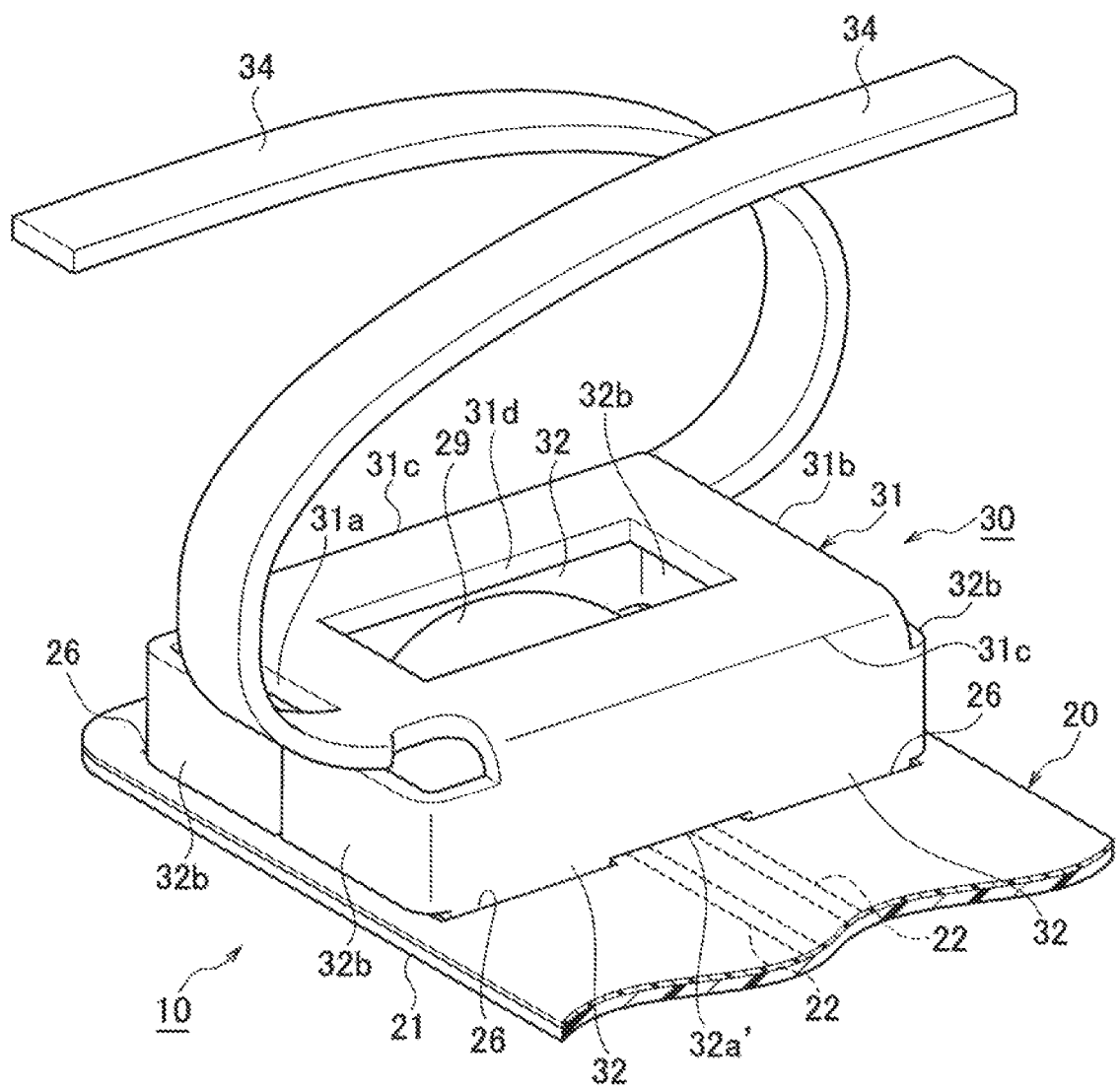
FIG. 7 is a perspective view illustrating an attachment structure for a temperature sensor according to the fourth embodiment of the present application.

FIG. 7 is a perspective view illustrating an attachment structure for a temperature sensor of the fourth embodiment of the present application.

An attachment structure 10 for a temperature sensor of the fourth embodiment is different from that of the third embodiment in that each pair of legs 32, 32 positioned on both sides of a metal leaf spring 30 are extended to a front portion 31a side (one side in the wiring width direction (front side in FIG. 2)) and a rear portion 31b side (the other side in the wiring width direction (back side in FIG. 2)) of a flat plate portion 31, and each extended portion 32b is formed to be bent in an L shape so as to surround a moisture-proof material 29, with which a chip NTC thermistor 12 of a temperature sensor 11 is sheathed, without any gap. Although a notch 32a' formed between each pair of legs 32, 32 positioned on both sides is formed smaller than that of the third embodiment, it is to be noted that the other configurations are similar to those of the third embodiment, and therefore the same components are denoted by the same reference numerals, and detailed description is omitted.

The attachment structure 10 for a temperature sensor of the fourth embodiment offers operation and effect similar to those of the third embodiment, since the chip NTC thermistor 12 is sheathed with the moisture-proof material 29 by potting between the four legs 32 of the metal leaf spring 30 surrounding the chip NTC thermistor 12 incorporated on a conductor exposed portion 23 of wiring patterns 22 of a flexible printed wiring board 20 by soldering.

In particular, since the four legs 32 of the metal leaf spring 30 and the extended portions 32b thereof can surround the moisture-proof material 29 without any gap, spread of the moisture-proof material 29 can be reliably restricted. Moreover, since the four legs 32 of the metal leaf spring 30 and the extended portions 32b have both effects of fixing the flexible printed wiring board 20 and restricting spread of the moisture-proof material 29, it is possible to further reduce the size of a part of the flexible printed wiring board 20 where the chip NTC thermistor 12 is incorporated and further reduce the cost.

Next, a comparative example will be described. An attachment structure for a temperature sensor according to a comparative example comes into contact with one power storage element (unit cell) of a power storage module (battery pack) and detects the temperature of the power storage element with the temperature sensor. The temperature sensor includes: a resin main body having a contact wall to come into contact with the power storage element; a temperature detecting element that is placed on the contact wall in a cavity of the main body and covered with a filler; and an elastically deformable plate-shaped front spring portion and an elastically deformable plate-shaped rear spring portion that are provided on a side of the main body opposite to the power storage element.

A front pressing portion and a rear pressing portion of a holder arranged on the upper surface of the power storage element come into contact with respective upper ends of the front spring portion and the rear spring portion, which extend upward from the main body to be bent in an S shape so as to intersect, from above, and the front spring portion and the rear spring portion are elastically deformed downward, so that the temperature detecting element side of the temperature sensor is pressed against the upper surface of the power storage element.

However, since a spring portion in the attachment structure for a temperature sensor according to the comparative example is made of resin, stress generated when the spring portion is deflected cannot be relaxed unless the spring length is increased in order to relax the stress. As the spring length is increased, the size of the spring portion becomes large, the whole structure becomes large, and restrictions may possibly be imposed when the spring portion is mounted on a power storage element (unit cell).

Moreover, since the number of components is large, assembling becomes complicated, and there is a concern that assembling processing cost is increased, and cost is increased.

Although a flexible printed wiring board (FPC) is used as the flexible thin plate-shaped cable in each embodiment, it is to be noted that the present application is not limited to this. For example, a flexible flat cable (FFC) or the like may be used as the flexible thin plate-shaped cable.

Although a chip NTC thermistor that is an element having a negative temperature characteristic (the resistance value decreases as the temperature rises) is used as the chip-shaped temperature measuring element in each embodiment, it is to be noted that the present application is not limited to this. For example, a chip PTC thermistor that is an element having a positive temperature characteristic (the resistance value increases as the temperature rises) or a chip CTR thermistor may be used as the chip-shaped temperature measuring element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An attachment structure for a temperature sensor that is attached to a flexible thin plate-shaped cable and detects a temperature of a unit cell of a battery pack having a plurality of the unit cells connected with each other, the attachment structure comprising:
   the flexible thin plate-shaped cable;
   a chip-shaped temperature measuring element that is incorporated on a conductor exposed portion of the flexible thin plate-shaped cable and detects the temperature of the unit cell; and
   a metal leaf spring that is placed around the conductor exposed portion of the flexible thin plate-shaped cable and has a plurality of legs arranged around the temperature measuring element, and an elastic piece configured to energize the plurality of legs toward the unit cell,
   wherein the temperature measuring element is sheathed with a moisture-proof material between the plurality of legs of the metal leaf spring, and wherein the plurality of legs is incorporated on the conductor exposed portion of the flexible thin plate-shaped cable and soldered to copper foil exposed portions provided around the temperature measuring element.

2. The attachment structure for the temperature sensor according to claim 1,
wherein the elastic piece comprises a plurality of arms having an opening of the elastic piece therebetween,
wherein the elastic piece is cantilevered away from the legs such that the arms are joined at a part of the elastic piece furthest away from the legs.

3. The attachment structure for the temperature sensor according to claim 1,
wherein the metal leaf spring includes
a flat plate portion arranged parallel to the flexible thin plate-shaped cable,
the plurality of legs formed to be bent from at least side portions of the flat plate portion toward the flexible thin plate-shaped cable, and
the elastic piece formed to be bent in a curved shape from at least one of a front portion and a rear portion of the flat plate portion to an opposite side of the flexible thin plate-shaped cable.

4. The attachment structure for the temperature sensor according to claim 3,
wherein openings are each formed at a center of the flat plate portion and at a center of the elastic piece so that the moisture-proof material is freely filled from the opening of the elastic piece through the opening of the flat plate portion to between the plurality of legs arranged around the temperature measuring element.

5. The attachment structure for the temperature sensor according to claim 3,
wherein the plurality of legs is extended toward the front portion and the rear portion of the flat plate portion so that the plurality of legs surrounds the temperature measuring element without any gap.

6. The attachment structure for the temperature sensor according to claim 3,
wherein the elastic piece is formed to be bent in a curved shape from a side of the front portion of the flat plate portion to an opposite side of the flexible thin plate-shaped cable.

7. The attachment structure for the temperature sensor according to claim 3,
wherein the elastic piece is formed to be bent in a curved shape from a side of the front portion and a side of the rear portion of the flat plate portion to an opposite side of the flexible thin plate-shaped cable so as to intersect.

\* \* \* \* \*